United States Patent [19]

Miller et al.

[11] 4,155,112
[45] May 15, 1979

[54] POWER SUPPLY CIRCUITRY

[75] Inventors: James A. Miller, Arlington Heights; Douglas W. Nickerson, East Dundee, both of Ill.

[73] Assignee: Motorola, Inc., Schaumburg, Ill.

[21] Appl. No.: 803,485

[22] Filed: Jun. 6, 1977

[51] Int. Cl.² ........................................... H02M 3/335
[52] U.S. Cl. ........................................ 363/21; 363/97
[58] Field of Search ........... 307/240; 323/17, DIG. 1, 323/79; 363/16, 18–21, 30, 24, 25, 96, 97, 99, 124, 131

[56] References Cited

U.S. PATENT DOCUMENTS

| | | |
|---|---|---|
| 2,663,806 | 12/1953 | Darlington ............................ 307/315 |
| 3,044,007 | 7/1962 | Akers .................................... 323/79 X |
| 3,419,781 | 12/1968 | Jullien-Davin ......................... 363/21 |
| 3,497,794 | 2/1970 | Fredrickson et al. .......... 323/17 UX |
| 3,514,688 | 5/1970 | Martin ................................ 363/20 X |
| 3,733,519 | 5/1973 | Grissey ...................... 323/DIG. 1 X |
| 3,736,496 | 5/1973 | Lachocki ............................ 363/21 X |
| 4,008,429 | 2/1977 | Phalan ............................... 363/16 X |

Primary Examiner—William M. Shoop
Attorney, Agent, or Firm—Rolland R. Hackbart; James W. Gillman

[57] ABSTRACT

A power supply circuitry including an input DC voltage source, a DC to DC up converter for converting the input DC voltage to an output DC voltage of greater magnitude and means for enabling the up converter to change the magnitude of the output DC voltage. The output voltage is further smoothed and filtered by a DC to DC series regulator.

7 Claims, 1 Drawing Figure

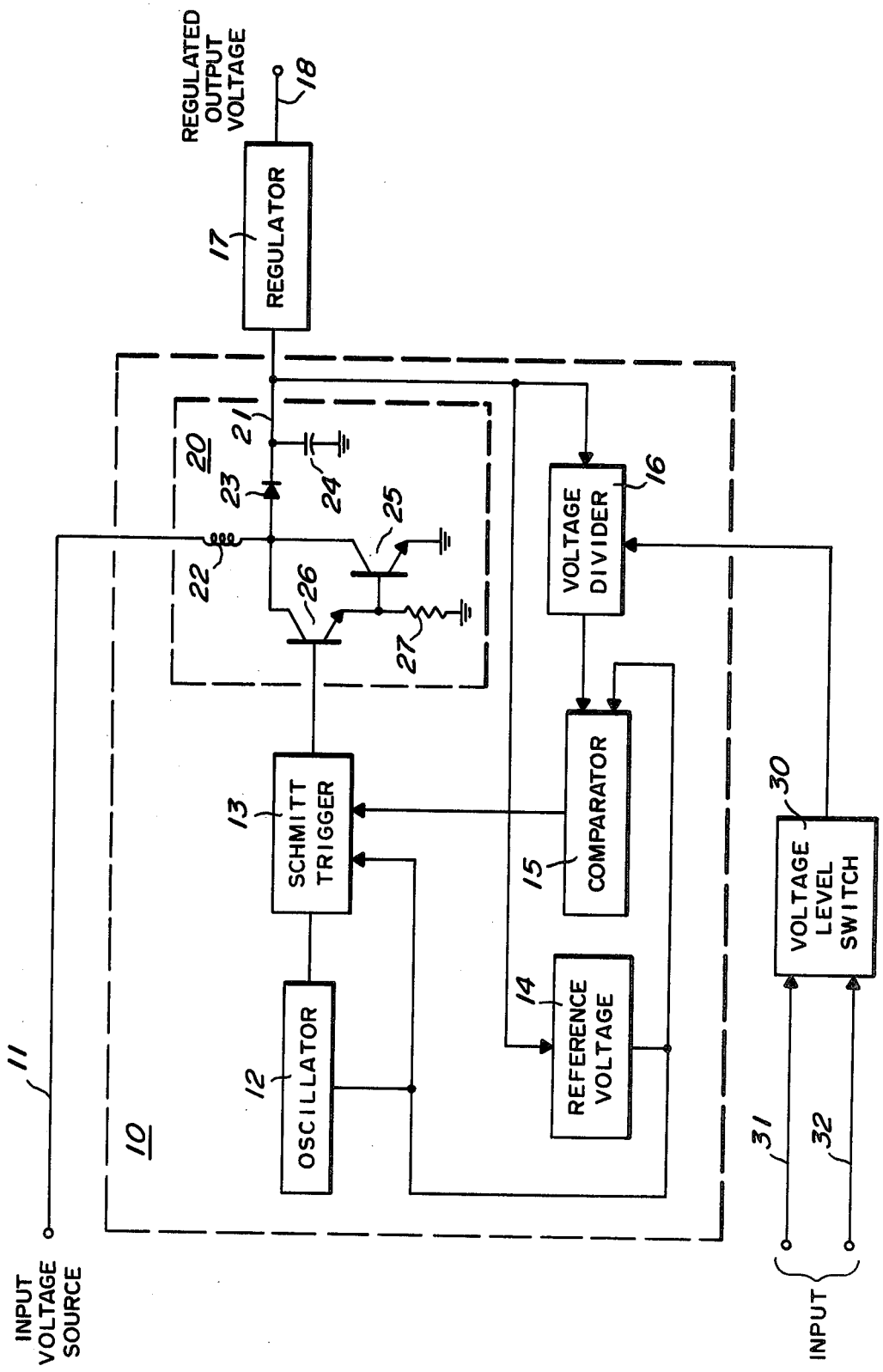

POWER SUPPLY CIRCUITRY

BACKGROUND OF THE INVENTION

1. Field of the Invention

This invention relates to a power supply circuitry, and more particularly, to an improved power supply circuitry.

2. Description of the Prior Art

Prior art power supply circuitry including a switching DC to DC up converter typically provide an output voltage of higher magnitude than an input voltage from a source voltage for a relatively narrow range of input voltage magnitudes. Such circuits will not operate in applications where a wide range of input voltage magnitudes must be accommodated. In addition, these circuits do not provide the capability of changing the magnitude of the output DC voltage in response to external inputs.

Prior art power supply circuitry which converts a battery voltage up to an output DC voltage of a greater magnitude generally do not maintain the output DC voltage over a wide range of input voltage magnitudes. For example, the output DC voltage of such circuits will tend to drop as the voltage source, such as a battery, becomes discharged or during voltage slumps due to peak current requirements.

For the foregoing and other shortcomings and problems, there has been a long felt need for an improved power supply circuitry.

SUMMARY OF THE INVENTION

Accordingly, it is an object of the present invention to provide an improved power supply circuitry.

It is a further object of the present invention to provide an improved power supply circuitry that maintains an output DC voltage over a wide range of input voltage magnitudes.

It is yet a further object of the present invention to provide a power supply circuitry that can be automatically disabled and re-enabled as the condition of the input voltage source changes.

Accordingly, a power supply circuitry is provided that includes an input voltage source for providing an input DC voltage, a DC to DC up converter for converting the input DC voltage to an output DC voltage of greater magnitude and means for enabling the up converter to change the magnitude of the output DC voltage. The magnitude of the output DC voltage can be varied either in a continuous manner or in discrete steps in response to activation of external inputs. The input voltage source can be any kind of DC voltage source, for example a battery, and can undergo a wide variation in magnitude. The output DC voltage is maintained at a predetermined magnitude, selected by the enabling means, over the wide range of input DC voltage from the input voltage source. The power supply circuitry is advantageously adapted to provide an output DC voltage for systems which require a maintained voltage to insure reliable operation, such as system utilizing volatile storage elements.

According to another feature of the invention, the DC to DC up converter includes an oscillator, a Schmitt trigger, and a converting circuitry connected in series in a forward path. The converting circuitry is responsive to the input DC voltage and the output of the Schmitt trigger for providing the output DC voltage proportional to the pulse width of the output of the Schmitt trigger. The pulse width of the Schmitt trigger is varied in order to maintain the output DC voltage.

The up converter also includes a voltage divider and a comparator connected in series in a feedback path. The voltage divider is responsive to the output DC voltage and the output of the enabling means for determining the magnitude of the output DC voltage. The comparator is responsive to the output of the voltage divider and a reference voltage for providing a feedback signal to the Schmitt trigger for varying the pulse width of the Schmitt trigger to maintain the predetermined output DC voltage.

The input DC voltage is stepped up to an output DC voltage of greater magnitude by the converting circuitry. As the load on the output DC voltage varies, the feedback signal from the comparator adjusts the pulse width of the Schmitt trigger to maintain the output DC voltage.

According to another feature of the invention, the enabling means includes switching means responsive to external inputs for providing output DC voltages of selected predetermined magnitudes. The voltage divider is responsive to the switching means for adjusting the feedback signal to the Schmitt trigger to provide an output DC voltage of a predetermined magnitude in accordance with the respective activated input of the switching means. The output DC voltage is further regulated down to a predetermined regulated output voltage by a DC to DC series regulator. Depending on the operational modes of the external circuitry powered by the power supply circuitry, the magnitude of the output DC voltage can be changed appropriately by activation of respective inputs of the switching means. In addition, if the input voltage source is of a greater magnitude than the predetermined magnitude represented by an activated input of the switching means, the up converter is disabled and the converting circuitry provides the input DC voltage from the input voltage source directly to the output DC voltage.

Additional features, objects and advantages of the power supply circuitry in accordance with the present invention will be more clearly apprehended from the following detailed description together with the accompanying drawing.

BRIEF DESCRIPTION OF THE DRAWING

FIG. 1 illustrates a power supply circuitry to which the present invention may be advantageously applied.

DESCRIPTION OF THE PREFERRED EMBODIMENT

Referring now to FIG. 1, a power supply circuitry in accordance with the present invention is shown which can be advantageously utilized in a system which includes volatile memory circuits or storage elements which must be maintained during operating conditions which produce a wide range of input DC voltages from an input voltage source. For example, an application where a battery is the input voltage source for a control circuitry having volatile memories can advantageously utilize a power supply circuitry in accordance with the present invention. Such a control circuitry operating in an automobile requires a maintained output DC voltage during battery slumps and low voltage battery conditions. In addition, during a standby mode when the control circuitry is not operating, the power supply circuitry in accordance with the invention disables the up converter to minimize battery drain and provide the battery voltage directly to the output DC voltage. If the battery discharges below a standby predetermined magnitude, the power supply circuitry re-enables the up converter to maintain the output DC voltage.

The foregoing and other features can be more clearly apprehended by referring to the respective circuits blocks in FIG. 1. A power supply circuitry in accordance with the present invention includes an input voltage source 11, a DC to DC up converter 10, a DC to DC series regulator 17 and an output voltage level switch 30. The up converter 10 includes an oscillator 12, a Schmitt trigger 13 and converting circuitry 20 connected in series in a forward path. The converting circuitry 20 is responsive to the input voltage source 11 and the output of the Schmitt trigger 13 for providing the output DC voltage 21 proportional to the pulse width of the output of the Schmitt trigger 13. The up converter 10 also includes a voltage divider 16 and a comparator 15 connected in series in a feedback path. The voltage divider is responsive to the output DC voltage 21 and to the voltage level switch 30 for determining the magnitude of the output DC voltage 21. The comparator 15 is responsive to the output of the voltage divider 16 and a reference voltage 14 for providing a feedback signal to the Schmitt trigger 13 for varying the pulse width of the output of the Schmitt trigger 13 to maintain a predetermined magnitude of the output DC voltage 21. The reference voltage 14 is also connected to the oscillator 12 and Schmitt trigger 13 and is fed from the output DC voltage 21 so that the operation of the up converter 10 is maintained regardless of the input DC voltage from the input voltage source 11.

The regulator 17 is a DC to DC series regulator which is responsive to the output DC voltage 21 for providing a regulated output voltage 18. The regulator 17 can be any of a number of DC to DC series regulator circuits similar to those described in Chapter 6 of the "Zener Diode Handbook" published by Motorola, Inc., Semiconductor Products, 1967. The regulator 17 down converts the output DC voltage 21 to a regulated output voltage 18 of lower magnitude. Any ripple, spikes or variations on the output DC voltage 21 are filtered and smoothed out by the regulator 17.

The output voltage level switch 30 is applied to the voltage divider 16 for changing the magnitude of the output DC voltage 21. Two or more inputs 31 and 32 are applied to the output voltage level switch 30 for selecting predetermined magnitudes of the output DC voltage 21. The voltage level switch 30 includes switching means, such as transistor switches, which is applied to the voltage divider 16 in accordance with the respective input 31 or 32 for changing the voltage divider 16 so that a predetermined magnitude of the output DC voltage 21 is provided. The switching means can include a plurality of inputs 31 and 32 for selecting various predetermined magnitudes of the output DC voltage 21 in response to the respective operating modes of a system which advantageously utilizes the power supply circuitry in accordance with the present invention.

The up converter 10 converts the input DC voltage from the input voltage source 11 to an output DC voltage 21 of greater magnitude and maintains the predetermined magnitude of the output DC voltage 21 over a wide range of input DC voltages from the input voltage source 11. If an input voltage source such as a battery is greater in magnitude than the predetermined output DC voltage determined by the voltage divider 16, the Schmitt trigger 13 is disabled by the comparator 15 and the converting circuitry 20 routes the battery voltage directly to the output DC voltage 21. When the battery discharges or momentarily falls below the predetermined magnitude determined by the voltage divider 16, the up converter 10 is re-enabled and maintains the output DC voltage 21 at the predetermined magnitiudie magnitude by the voltage divider 16.

The oscillator 12 provides a train of pulses to the Schmitt trigger 13 which varies the pulse width of the train of pulses in response to the output of the comparator 15. The oscillator 12 and the Schmitt trigger 13 can be constructed from conventional circuitry similar to that described in Chapter 8 of the "Motorola MCMOS Handbook" published by Motorola, Inc., 1974. The oscillator 12 is generally operated at a relatively high frequency, for instance 20KHz, so that interference is not produced at audio frequencies.

The converting circuitry 20 converts the input DC voltage to an output DC voltage 21 of greater magnitude when the up converter 10 is enabled or routes the input DC voltage from the input voltage source 11 directly to the output DC voltage 21 when the up converter 10 is disabled. The converting circuitry 20 includes an inductor 22 coupled to the input voltage source 11, the transistor switches 25 and 26 and the anode of diode 23. The cathode of diode 23 is coupled to the capacitor 24 and to the output DC voltage 21. When the up converter 10 is disabled, the input DC voltage from the input voltage source 11 is applied to the output DC voltage 21 through the inductor 22 and the diode 23. When the up converter 10 is enabled, the output pulses from the Schmitt trigger 13 enable the transistor switches 25 and 26 to store energy from the input voltage source 11 into the inductor 22 in proportion to the pulse width of the output pulses from the Schmitt trigger 13. The energy stored in the inductor 22 by the transistor switches 25 and 26 during an output pulse from the Schmitt trigger 13 is transferred through the diode 23 to the capacitor 24 when the transistor switches 25 and 26 turn off at the end of the output pulse. The current which had been flowing through inductor 22 produces a back emf across inductor 22 which is subsequently transferred through the diode 23 to the capacitor 24 to maintain the output DC voltage 21. The transistor switches 25 and 26 together with resistor 27 are connected in a Darlington configuration for improving efficiency, although only a single transistor switch is necessary in practicing the present invention.

The output DC voltage 21 is applied to the voltage divider 16 which can be mechanized as a resistive divider network, as is known in the art. The voltage divider 16 provides an output voltage to the comparator 15 which is a predetermined proportion of the output DC voltage 21. Different predetermined proportions of the output DC voltage 21 can be selected by the output voltage level switch 30. In response to the inputs 31 or 32, the output voltage level switch 30 enables a respective resistive divider circuit which provides a predetermined proportion of the output DC voltage 21 for selecting a predetermined magnitude of the output DC voltage 21.

The comparator 15 is responsive to the output voltage from the voltage divider 16 and the reference voltage 14 for providing an output voltage to the Schmitt trigger 13 for varying the pulse width of the output pulses from the Schmitt trigger to maintain a predetermined magnitude of the output DC voltage 21. The comparator 15 can be any of a number of commercially available differential amplifiers. The reference voltage 14 is developed from the output DC voltage 21 by a zener diode shunt regulator or similar circuit, as is known in the art. During operation the predetermined magnitude of the output DC voltage 21 is maintained under load by the converting circuitry 20 in proportion to the pulse width of the output pulses from the Schmitt trigger 13. As the load changes, the comparator 15 changes the feedback voltage to the Schmitt trigger 13 to vary the pulse width of the output pulses from the Schmitt trigger 13 so as to maintain constant the output DC voltage 21.

Transients or spikes on the input voltage source 11 are filtered by the inductor 22 and also by the capacitor 24. Negative transients on the input voltage source 11 reverse bias the diode 23, and the stored energy in the capacitor 24 sustains the regulated output voltage 18 for the duration of relatively substantial negative transients. Transients on the output DC voltage 21 are further filtered and smoothed out by the regulator 17.

The foregoing power supply circuitry can be advantageously applied to a mobile radio telephone control circuitry for maintaining an output voltage to such a control circuitry over a wide range of battery voltages. For example, activation of either of the inputs 31 or 32 to the voltage level switch 30 results in an output DC voltage 21 which is approximately twenty volts. The output DC voltage 21 is down regulated by the regulator 17 to provide a regulated output voltage 18 of approximately fifteen volts. The normal operating mode of the control circuitry corresponds to the activation of either of the inputs 31 or 32. A standby operating mode of the control circuitry is provided when neither of the inputs 31 or 32 is activated. During standby operation, the voltage divider 16 provides for a standby predetermined magnitude of the output DC voltage 21 which is approximately 11.75 volts. If the battery voltage is greater than the standby output DC voltage 21, the up converter 10 is disabled and the battery voltage is applied directly to the output DC voltage 21 through the inductor 22 and the diode 23. The regulator 17 saturates when the output DC voltage 21 drops below approximately 15.6 volts and introduces a voltage drop of 0.6 volts between the output DC voltage 21 and the regulated output voltage 18. Standby current drain from the battery is minimized since the up converter 10 is disabled. If the battery voltage discharges or momentarily slumps below 11.75 volts, the up converter 10 is re-enabled to provide an output DC voltage 21 of approximately 11.75 volts. Slumps in the battery voltage to as low as four volts from a nominal voltage of approximately thirteen volts can be expected during the starting of an automobile. The power supply circuitry in accordance with the present invention will maintain the output DC voltage 21 at a voltage level of twenty volts for the normal operating mode or 11.75 volts for the standby operating mode during the starting of an automobile. Thus, information in the storage elements or memories of the control circuitry will not be altered or destroyed during low battery voltage conditions. A power supply circuitry in accordance with the present invention can be advantageously utilized in any system requiring that the output DC voltage be maintained at predetermined levels for various system operating modes over a wide range of input voltages. The features of the present invention can be broadly applied to many applications where vital information is stored in volatile memory circuits, registers or other storage elements.

The foregoing embodiments have been intended as illustrations of the principles of the present invention. Accordingly, other modifications, uses and embodiments can be devised by those skilled in the art without departing from the spirit and scope of the principles of the present invention.

What is claimed is:

1. In a power supply connectable to a battery undergoing substantial negative transients and voltage slumps, said power supply including a DC to DC up converter and a DC to DC series regulator coupled to the DC to DC up converter for supplying at least a minimum predetermined DC output voltage to volatile circuitry, said DC to DC up converter including a forward path having an oscillator, a Schmitt trigger and a converting circuitry having a transistor switch, inductor, diode and capacitor, the transistor switch turned on in response to pulses from the Schmitt trigger being applied thereto, the transistor switch connected to a first terminal of the inductor and the anode of the diode, a second terminal of the inductor connected to the battery, the cathode of the diode connected to the capacitor across which is provided a DC to DC up converter output voltage, and said DC to DC up converter including a feedback path having a voltage divider connected to the DC to DC up converter output voltage, a reference voltage and a comparator responsive to the voltage divider output and the reference voltage for controlling the Schmitt trigger, said power supply including improvement which comprises:

means coupled to the DC to DC up converter output voltage for providing said reference voltage therefrom, said reference voltage powering the oscillator and Schmitt trigger;

at least one input signal;

switching means responsive to said input signal for switching the voltage divider from a first ratio corresponding to a DC to DC up converter output voltage of a standby predetermined magnitude to a second ratio corresponding to a DC to DC up converter output voltage of a normal predetermined magnitude, the normal predetermined magnitude being greater than the standby predetermined magnitude; and said comparator responsive to the reference voltage and the voltage sensed by the voltage divider for automatically disabling the Schmitt trigger when the magnitude of the battery voltage, as indicated by the DC to DC up converter output voltage, is greater than the standby predetermined magnitude, and greater than the normal predetermined magnitude when the input signal is present, the battery voltage being coupled to the DC to DC up converter output voltage by the converting circuitry when the Schmitt trigger is disabled.

2. The power supply according to claim 1, wherein the Schmitt trigger is re-enabled when the magnitude of the battery voltage drops to substantially the same magnitude as the standby predetermined magnitude.

3. The power supply according to claim 1 wherein the DC to DC series regulator saturates when the magnitude of the DC to DC up converter output voltage is less than the standby predetermined magnitude.

4. The power supply according to claim 1, wherein the comparator is a differential amplifier.

5. The power supply according to claim 1, wherein the reference voltage providing means includes a zener diode shunt regulator coupled to the DC to DC up converter output voltage.

6. The power supply according to claim 1, wherein the volatile circuitry is the control circuitry of a mobile radiotelephone that includes volatile memory circuits.

7. The power supply circuitry according to claim 1, wherein the transistor switch of the converting circuitry is a Darlington transistor switch.

* * * * *